United States Patent [19]

Genna et al.

[11] Patent Number: 4,837,439

[45] Date of Patent: Jun. 6, 1989

[54] SCINTILLATION CAMERA WITH SEGMENTED LIGHT PIPE

[75] Inventors: Sebastian Genna, Belmont; Andrew P. Smith, Medford, both of Mass.

[73] Assignee: Digital Scintigraphics, Inc., Cambridge, Mass.

[21] Appl. No.: 159,657

[22] Filed: Feb. 24, 1988

[51] Int. Cl.$^4$ ............................................. G01T 1/164
[52] U.S. Cl. .................... 250/368; 250/363.04; 250/366
[58] Field of Search .......... 250/368, 367, 366, 363 SH, 250/363 SB

[56] References Cited

U.S. PATENT DOCUMENTS

| | | | |
|---|---|---|---|
| 4,095,107 | 6/1978 | Genna et al. | 250/363 SB |
| 4,291,228 | 9/1981 | Thompson | 250/363 S |
| 4,394,576 | 7/1983 | Tanaka et al. | 250/366 |
| 4,584,478 | 4/1986 | Genna et al. | 250/363 SB |
| 4,694,177 | 9/1987 | Akai | 250/368 |
| 4,755,680 | 7/1988 | Logan | 250/363 R |

*Primary Examiner*—Janice A. Howell
*Assistant Examiner*—Constantine Hannaher
*Attorney, Agent, or Firm*—Joseph S. Iandiorio; Douglas E. Denninger

[57] ABSTRACT

A scintillation camera having scintillation material which emits light in response to absorbed radiation, an array of photodetectors for detecting the emitted light, and a segmented light pipe which conducts the emitted light to the photodetectors. The light pipe includes a plurality of segments which intersect with adjacent segments at an angle and define planar faces which are optically coupled to the photodetectors.

19 Claims, 3 Drawing Sheets

SCINTILLATION CAMERA WITH SEGMENTED LIGHT PIPE

FIELD OF INVENTION

This invention relates to a radionuclide emission tomography camera having a segmented light pipe and more particularly to such a light pipe whose segments are a plurality of planar, angled faces optically coupled to the photodetectors of the camera.

BACKGROUND OF INVENTION

There are a number of radionuclide emission tomography cameras utilizing scintillation material which emits light in response to absorbed radiation emanating from an object to be studied. The scintillations are detected by an array of photodetectors.

Presently, the photodetectors are optically coupled to the scintillation material by a single, integral light pipe which has an area corresponding to the combined area of an entire array of photodetectors. In Genna et al., U.S. Pat. No. 4,095,107, for example, light pipe 45 extends between photodetector array 47 and scintillation crystal 43, FIG. 4.

For scintillation material which is curvilinear, such as the arcuately shaped crystal of the above patent or the annular single crystal of Genna et al., U.S. Pat. No. 4,584,478, fashioning a light pipe having an inner face which matches the curvature of the curvilinear scintillation material and an outer face which matches the photodetectors is difficult and expensive. The need for such a light pipe has hampered efforts to develop cost-effective scintillation cameras which utilize curvilinear scintillation material. Further, it is difficult to correctly position and maintain the alignment of photodetectors relative to the curved scintillation material.

An additional problem is posed by curved scintillation material. The location of a radionuclide source within an object to be imaged is determined from gamma ray trajectories, whose collimated direction is in turn determined from the light emissions they produce in the scintillation material. Resolution by the photodetector array of the gamma ray trajectories depends on the proportion of light emission that is collected by the photodetector nearest the emission and photodetectors adjacent to it.

The distance of the edges of the photodetector to the inner face of the scintillation material largely determines the distribution of light collected by the photodetectors and therefore controls resolution. However, for an annular or arcuately-shaped scintillation crystal, the distance from the photodetector edges to the face of the scintillation material, hereinafter referred to as the separation distance, is different when viewed azimuthally as compared to axially. The separation distance seen by light travelling in the azimuthal plane is determined by the photodetector edges perpendicular to the azimuthal plane, and these edges are a uniform distance from the scintillation material. However, light travelling along one plane parallel to the axis of rotation will encounter a different separation distance than that encountered by light travelling along another axial plane which intersects the detector face at a different azimuthal location.

In three-dimensional radionuclide reconstruction using single photon emission computed tomography employing a stationary annular crystal with rotating collimator, as shown in U.S. Pat. No. 4,584,478, or a tomographic system in which the camera's detector and collimator rotate in unison, as shown in U.S. Pat. No. 4,095,107, one-dimensional resolution in the azimuthal direction determines, through image reconstruction, two-dimensional resolution in an azimuthal plane normal to the axis of rotation. This two-dimensional resolution is not affected by resolution in the axial direction. Higher resolution may be desired in the azimuthal direction, for example, if diagnoses are made from images obtained from azimuthal slices, normal to the axis of rotation, of three-dimensional reconstructed images.

Within limits, the average resolution of a crystal detector/photodetector array is improved as the photodetectors are moved closer to the scintillation material. However, the resolution, as a function of scintillation position relative to the center of the photodetectors, becomes increasingly nonuniform as the distance decreases. Therefore, a compromise between average resolution and nonuniformity must be reached.

Moreover, the difference in effective separation distance of the photodetector edges and the different criteria governing the optimization of resolution characteristics generate different optimal separation distances for the azimuthal and axial directions. A compromise must therefore also be reached in setting the final separation distance of the photodetector from the scintillation material.

SUMMARY OF INVENTION

It is therefore an object of this invention to provide efficient, cost-effective coupling of photodetectors to scintillation material.

It is a further object of this invention to provide improved mounting of photodetectors relative to curved scintillation material.

Yet another object of this invention is to provide improved resolution characteristics in one dimension without affecting resolution in another dimension.

This invention results from the realization that a truly effective, cost-efficient scintillation camera can be achieved by optically coupling photodetectors to scintillation material using a segmented light pipe having a number of angularly arranged, discrete segments which are inexpensively fabricated and readily arranged to interface with the scintillation material regardless of its shape. It is a further realization that the junctions of the light pipe segments can be provided with reflective medium to modify the resolution characteristics of the scintillation camera in a direction normal to the junctions while not affecting resolution in a direction parallel to the junctions.

This invention features a scintillation camera having a segmented light pipe. There is scintillation material for emitting light in response to absorbed radiation, an array of photodetectors for detecting the emitted light, and a segmented light pipe for conducting the emitted light to the photodetectors. The light pipe includes a plurality of segments disposed about the scintillation material, each segment intersecting at an angle to form a junction with adjacent segments. Each segment defines a generally planar face which is optically coupled to at least one of the photodetectors.

In one embodiment, the scintillation material is curvilinear and the camera further includes optically reflective surfaces extending into the light pipe at the junctions. The reflective surfaces increase the amount of light collected by the photodetector nearest each emission and improve resolution of the camera in a direction normal to the reflective surfaces without affecting resolution in a direction parallel to the reflective surfaces. In one construction, the camera has an axis of rotation and the junctions are aligned substantially parallel to the axis of rotation, and the optically reflective surfaces improve resolution in the azimuthal direction without affecting resolution in the axial direction.

The reflective surfaces may include a reflective mask disposed in each of the junctions and extending lengthwise between adjacent photodetectors or may include reflective material disposed on chamfers on the segments. The reflective masks or support strips may extend outwardly beyond the segments at the junctions to position the photodetectors relative to the segments.

In another embodiment each segment has a width substantially the same as that of each photodetector, and the scintillation material is a single scintillation crystal. The camera further includes collimator means for collimating radiation incident on the scintillation crystal, and at least one of the collimator means and the photodetector array rotates about the axis of rotation. Each segment has an inner, planar face disposed proximate the scintillation material, and each segment is chamfered at each of its inner edges which meet at one of the junctions. Each segment is a discrete element fastened to each adjacent segment. Alternatively, the segments are integral.

DISCLOSURE OF PREFERRED EMBODIMENT

Other objects, features and advantages will occur from the following description of a preferred embodiment and the accompanying drawings, in which.

This invention may be accomplished by a scintillation camera having a segmented light pipe which optically couples a number of photodetectors to scintillation material. The light pipe is formed from a number of segments, each segment intersecting at an angle to form a junction with adjacent segments. Each segment defines a generally planar face which is optically coupled to one or more of the photodetectors.

Figure 1:
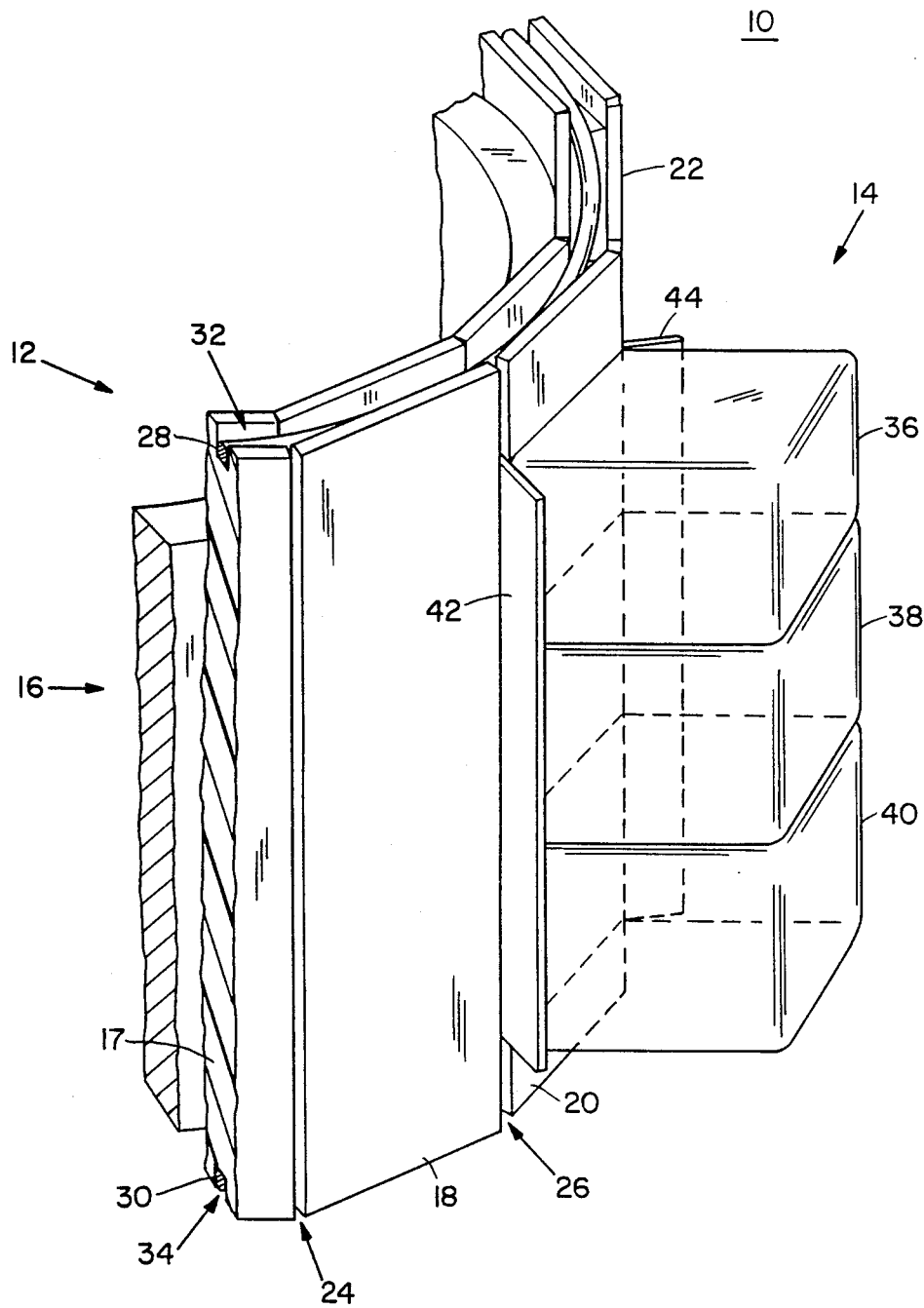
FIG. 1 is a partial, axonometric view of a scintillation camera according to this invention having a number of discrete light pipe segments with reflective masks at their junctions.

Scintillation camera 10 according to this invention, FIG. 1, includes polygonal segmented light pipe 12 which optically couples photodetectors 14 to scintillation crystal 16. Light pipe 12 is formed of discrete segments such as segments 17, 18, 20, 22. The segments intersect at an angle with adjoining segments. For example, segment 18 intersects with segments 17, 20 at junctions 24, 26, respectively. The segments are fastened together by epoxy in the junctions and by epoxy with reinforcement wires 28, 30 which lie within upper and lower grooves 32, 34, respectively.

Photodetectors 14 include photomultiplier tubes 36, 38, 40 positioned on light pipe segment 20. Other photomultiplier tubes have been removed for clarity of illustration. The photodetectors are positioned relative to each other in the azimuthal direction by support strips 42, 44 which in this construction also serve as reflective masks.

Figure 2:
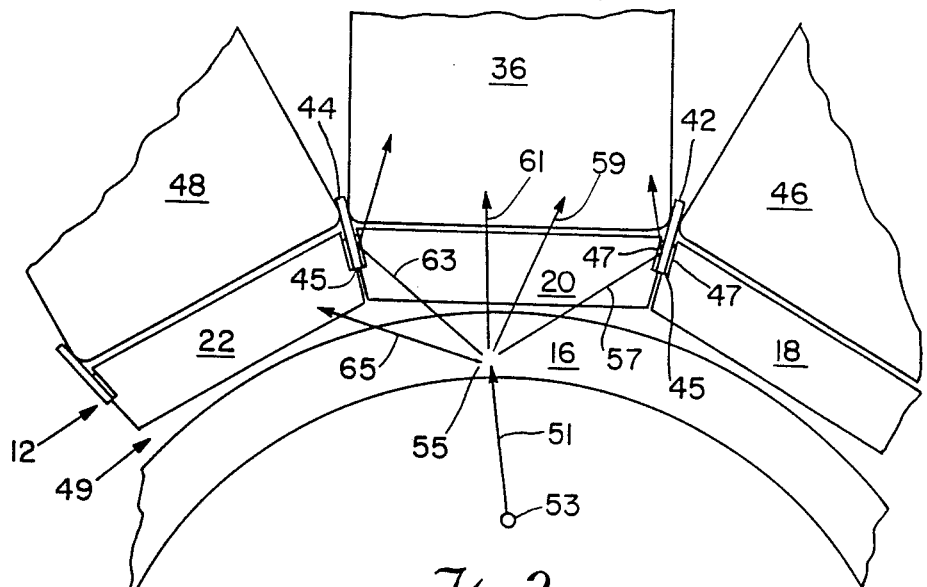
FIG. 2 is a partial cross-sectional view in a plane normal to the axis of rotation of the camera of FIG. 1.

Support strips 42, 44 extend into light pipe 12 as shown in FIG. 2. The position of leading edges 45 controls camera resolution in the azimuthal direction. Gamma ray trajectory 51 from radionuclide source 53, upon striking scintillation crystal 16, generates light emission 55 represented by rays 57, 59, 61, 63, 65. Rays 67, 63 would normally be collected by photomultiplier tubes 46, 48, respectively. Instead, reflective surfaces of support strips 42, 44 redirect those light rays to intensify the signal from photomultiplier tube 36. As described below, resolution in the azimuthal direction is improved by the reflective surfaces while resolution in the axial direction is virtually unaffected because the reflective material does not separate the photodetectors in the axial direction and thus does not affect light distribution in the axial direction.

In one construction, support strips 42, 44 are made from steel coated with reflective paint to additionally serve as reflective masks. The inner planar faces of light pipe segments 18, 20, 22 are optically coupled to scintillation crystal 16 by a silicone gel 47 which fills gap 49.

Figure 3:
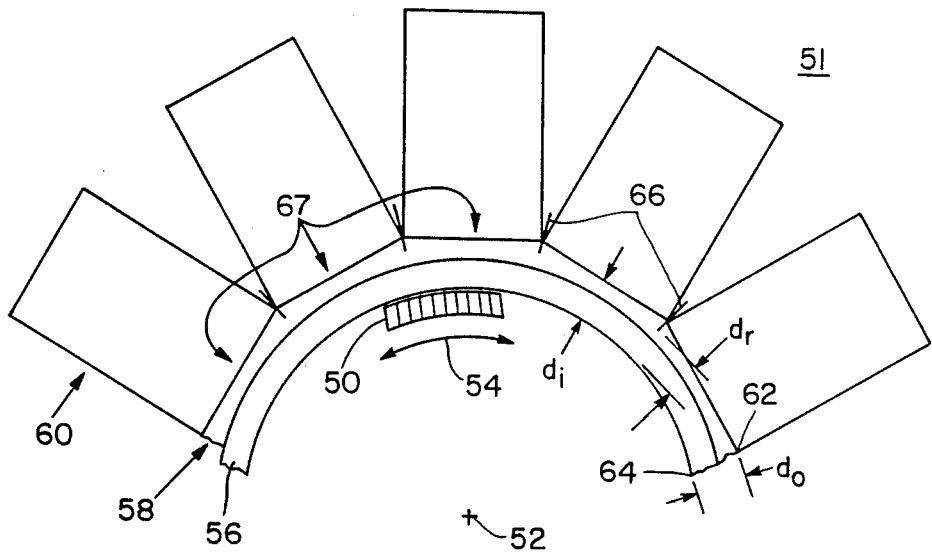
FIG. 3 is a schematic view normal to the axis of rotation of a scintillation camera according to this invention having reflective material which modifies resolution in the azimuthal direction without affecting resolution in the axial direction.

Scintillation camera 51 according to this invention, FIG. 3, has integral light pipe 58 with reflective surfaces 66 disposed at the junctions of the planar-faced segments 67 of light pipe 58. A collimator, a portion of which is shown as collimator segment 50, rotates in the rotational plane about axis of rotation 52 in the direction represented by arrow 54. Gamma rays from one or more radionuclide sources are guided by the holes within collimator segment 50 and are projected onto the surface of scintillation crystal 56. Upon absorbing the gamma radiation, crystal 56 scintillates and the emitted light is guided by light pipe 58 to photodetectors 60.

Resolution in scintillation camera 51 is controlled both by the actual edges of the photodetectors and by the edges of reflective surfaces 66: the placement of the edges determines the allocation of emitted light among the photodetectors. The distance between the innermost edges of optically reflective surfaces 66 and the inner face of scintillation crystal 56 modifies the resolution of camera 51 relative to conventional cameras. In conventional scintillation cameras, resolution of gamma ray trajectories is determined in the azimuthal direction by the distance $d_o$ between outer edge 62 of photodetector 60 and inner face 64 of scintillation crystal 56. In the axial direction, however, resolution is a function of distances which vary between outer distance $d_o$ and inner distance $d_i$.

When optically reflective surfaces 66 according to this invention extend into light guide 58, resolution in the azimuthal direction is no longer determined by outer distance $d_o$ but instead by distance $d_r$ between the reflective material and the inner face 64 of crystal 56. Because reflective surfaces 66 extend axially, the resolution of the scintillation camera in the axial direction is virtually unaffected. The reflective material directs light away from the junctions and toward the nearest photomultiplier while masking the light from adjacent photomultipliers.

The need to decrease the effective distance of the edges of the photodetectors in the azimuthal direction without affecting the distance in the axial direction arises from the different requirements of the camera in those directions. In general, average resolution increases as edge distance decreases, but nonuniformity, that is, variation in intrinsic resolution as a function of scintillation position, also becomes greater. The optimal distance of photodetector edges is typically greater for optimal resolution characteristics in the axial direction than for resolution characteristics in the azimuthal direction. By separating the photodetectors in the azimuthal direction with optically reflecting surfaces extending into the light pipe, control of resolution is now achieved independently to optimize resolution characteristics in both the axial and azimuthal directions.

Further, when the three-dimensional image is reconstructed, reconstructed resolution in the azimuthal plane is an average of measured azimuthal resolutions. The averaging reduces nonuniformities in resolution such that nonuniformities which would otherwise be too great become acceptable after averaging. Therefore, a smaller separation distance, which improves resolution, is enabled in the azimuthal direction.

Figure 4:
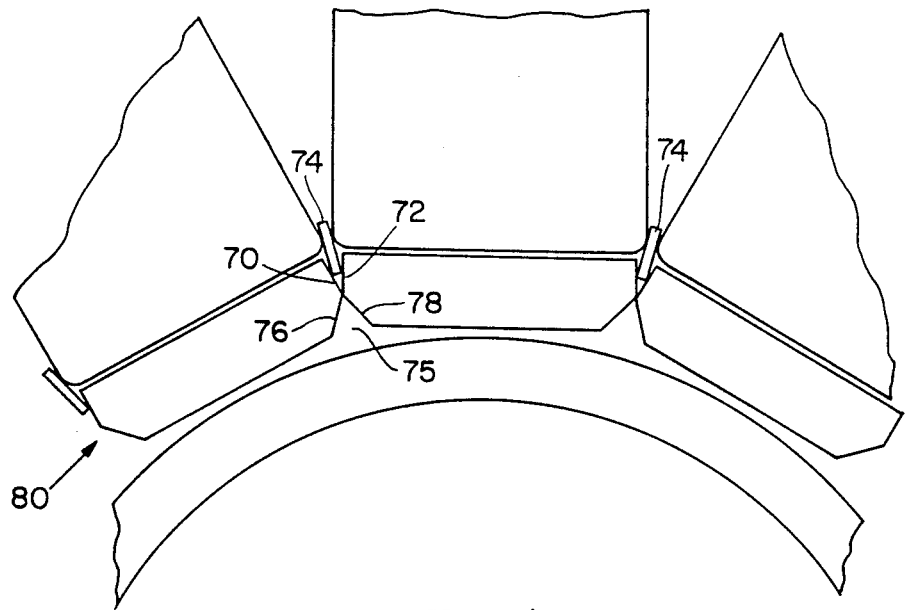
FIG. 4 is a similar view of another scintillation camera according to this invention having reflective chamfered edges.

The effective edge distance can also be altered by placing a reflective medium against outer chamfered edges 70, 72 as shown in FIG. 4. The space between edges 70, 72 in one construction is filled with reflecting epoxy, and in another construction is coated with a white paint containing magnesium oxide. When chamfered edges 70, 72 are thus coated with reflective material, support strips 74 need not be optically reflective. Alternatively, edges 70, 72 are themselves reflecting and do not require an additional coating.

Inner chamfered edges 76, 78 permit a high degree of curvature for light pipe 80. Gap 75 between inner chamfered edges 76, 78 is filled with transmissive epoxy or silicon gel having an index of refraction substantially the same as light pipe 80. The discrete segments of light pipe 80 may be constructed of quartz, glass, or plastic.

While a segmented light pipe according to this invention has been described as having junctions parallel to the axis of rotation, this is not a limitation of the invention. Instead of an arcuate or cylindrical light pipe, a hemispherical light pipe can be constructed. For example, one such hemispherical light pipe has a geodesic structure with interlocking polygons.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A scintillation camera, comprising:
   optically continuous scintillation material for emitting light in response to absorbed radiation;
   an array of photodetectors for detecting said emitted light;
   a segmented light pipe for conducting said emitted light to said photodetectors, said light pipe including a plurality of segments disposed about said scintillation material, each said segment intersecting at an angle to form a junction with adjacent segments and each defining a generally planar face optically coupled to at least one of said photodetectors, and each said segment optically coupled to adjacent segments to allocate light among said photodetectors across said junctions; and
   optically reflective surfaces extending into said light pipe at said junctions for increasing collection of light by the photodetector nearest each emission and improving resolution of said camera in a direction normal to said reflective surfaces without affecting resolution in a direction parallel to said reflective surfaces.

2. The camera of claim 1 in which said scintillation material is curvilinear.

3. The camera of claim 1 further including optically reflective surfaces extending into said light pipe at said junctions for increasing collection of light by the photodetector nearest each emission and improve resolution of said camera in a direction normal to said reflective surfaces without affecting resolution in a direction parallel to said reflective surfaces.

4. The camera of claim 3 in which said camera has an axis of rotation and said junctions are aligned substantially parallel to said axis of rotation, and said optically reflective surfaces improve resolution in the azimuthal direction without affecting resolution in the axial direction.

5. The camera of claim 4 further including collimator means for collimating radiation incident on said scintillation material, at least one of said collimator means and said photodetector array being rotatable about the axis of rotation.

6. The camera of claim 1 in which said segments and said photodetectors have substantially the same width.

7. The camera of claim 1 in which said scintillation material is a single, optically continuous scintillation crystal.

8. The camera of claim 7 in which said scintillation crystal is curvilinear.

9. The camera of claim 1 in which each said segment further includes an inner, planar face disposed proximate said scintillation material.

10. The camera of claim 9 in which each said segment is chamfered at each of its inner edges which meet at a said junction.

11. The camera of claim 1 in which each said segment is a discrete element fastened to each adjacent segment.

12. The camera of claim 1 in which said segments are integral.

13. A scintillation camera, comprising:
    curvilinear scintillation material for emitting light in response to absorbed radiation;
    an array of photodetectors for detecting said emitted light;
    a segmented light pipe for conducting said emitted light to said photodetectors, said light pipe including a plurality of segments disposed about said scintillation material, each said segment intersecting at an angle greater than zero degrees with adjacent segments at one or more junctions and defining a generally planar face optically coupled to at least one of said photodetectors, and each said segment optically coupled to adjacent segments to allocate light among said photodetectors across said junctions; and
    optically reflective surfaces extending into said light pipe at said junctions for increasing collection of light by the photodetector nearest each emission and improving resolution of said camera in a direction normal to said reflective surfaces without affecting resolution in a direction parallel to said reflective surfaces.

14. A scintillation camera, comprising:
    optically continuous, curvilinear scintillation material for emitting light in response to absorbed radiation;
    an array of photodetectors for detecting said emitted light;

a segment light pipe for conducting said emitted light to said photodetectors, said light pipe including a plurality of segments disposed about said scintillation material, each said segment intersecting at an angle greater than zero degrees with adjacent segments at one or more junctions and defining a generally planar face optically coupled to at least one of said photodetectors, said segments having a width substantially the same as that of each said photodetector, and each said segment optically coupled to adjacent segments to allocate light among said photodetectors across said junctions;

optically reflective surfaces extending into said light pipe at said junctions for increasing collection of light by the photodetector nearest each emission and improving resolution of said camera in a directional normal to said reflective surfaces without affecting resolution in a direction parallel to said reflective surfaces; and said camera having an axis of rotation and said junctions being aligned substantially parallel to said axis of rotation, and said optically reflective surfaces improving resolution in the azimuthal direction while minimizing changes in resolution in the axial direction.

15. A scintillation camera, comprising:

scintillation material for emitting light in response to absorbed radiation;

an array of photodetectors for detecting said emitted light;

a segmented light pipe for conducting said emitted light to said photodetectors, said light pipe including a plurality of segments disposed about said scintillation material, each said segment intersecting at an angle to form a junction with adjacent segments and each defining a generally planar face optically coupled to at least one of said photodetectors;

optically reflective surfaces extending into said light pipe at said junctions for increasing collection of light by the photodetector nearest each emission and improving resolution of said camera in a direction normal to said reflective surfaces without affecting resolution in a direction parallel to said reflective surfaces, said reflective surfaces including a reflective mask disposed in each of said junctions extending lengthwise between adjacent photodetectors.

16. The camera of claim 15 in which each said reflective mask also extends outwardly beyond said segments to position said photodetectors relative to said segments.

17. The camera of claim 15 in which said segments include recesses at their outer edges for receiving said reflective masks.

18. A scintillation camera, comprising:

scintillation material for emitting light in response to absorbed radiation;

an array of photodetectors for detecting said emitted light;

a segmented light pipe for conducting said emitted light to said photodetectors, said light pipe including a plurality of segments disposed about said scintillation material, each said segment intersecting at an angle to form a junction with adjacent segments and each defining a generally planer face optically coupled to at least one of said photodetectors;

optically reflective surfaces extending into said light pipe at said junctions for increasing collection of light by the photodetector nearest each emission and improving resolution of said camera in a direction normal to said reflective surfaces without affecting resolution in a direction parallel to said reflective surfaces; and said segments being chamfered at their outer edges at said junctions and including reflective material disposed on said chamfers to redirect light to the photodetector nearest each emission.

19. The camera of claim 18 further including support strips, disposed at said junctions, for positioning said photodetectors relative to said segments.

* * * * *